United States Patent [19]

Boeke et al.

[11] 4,389,522

[45] Jun. 21, 1983

[54] PROCESS FOR THE THERMAL AFTER-TREATMENT OF PASTE-FORMING POLYMERS OF VINYL CHLORIDE

[75] Inventors: Burkhard Boeke, Haltern; Josef Kalka, Herten; Manfred Smolinski, Marl; Heinz Baukholt, Dorsten, all of Fed. Rep. of Germany

[73] Assignee: Chemische Werke Huls, A.G., Marl, Fed. Rep. of Germany

[21] Appl. No.: 316,018

[22] Filed: Sep. 16, 1981

[30] Foreign Application Priority Data

Sep. 17, 1980 [DE] Fed. Rep. of Germany ....... 3034983

[51] Int. Cl.$^3$ ................................................ C08F 6/14
[52] U.S. Cl. ................................ 528/503; 526/344; 528/502
[58] Field of Search ................. 528/502, 503; 526/344

[56] References Cited

U.S. PATENT DOCUMENTS 4,133,947 1/1979 Kalka .................................. 528/502
4,207,412 6/1980 Kalka .................................. 528/499

OTHER PUBLICATIONS

R.G.C., vol. 40, No. 10, 1963, p. 1467, J. Delorme.

Primary Examiner—C. A. Henderson
Attorney, Agent, or Firm—Millen & White

[57] ABSTRACT

In a process for the thermal after-treatment of paste-forming homo- or copolymers of vinyl chloride, obtained by aqueous emulsion polymerization, followed by spray-drying to produce a spray-dried powder, an improvement is provided wherein 20 to 60 percent by weight of the spray-dried powder is warmed for 1 second to 30 minutes to a treating temperature of 75°–110° C., and then is recombined with the non heat-treated, 80–40 percent by weight portion of the powder.

8 Claims, No Drawings

PROCESS FOR THE THERMAL AFTER-TREATMENT OF PASTE-FORMING POLYMERS OF VINYL CHLORIDE

BACKGROUND OF THE INVENTION

The present invention relates to a process for heat treating paste-forming polymers of vinyl chloride.

It is already known to after-treat polyvinyl chloride (PVC) powders intended for the preparation of pastes, by heating them to 30°–40° C. above the drier temperature (J. Delome, Rév. Gén. Caoutch. 40 (1963), No. 10, pages 1467 to 1474). Polyvinyl chloride powders which are subjected to this treatment, upon mixing with plasticisers, yield pastes having improved shelf life (compare Example 2 of the table herein). Since the drier temperatures are normally 55° to 70° C., the powders are warmed to 85°–110° C.

However, as can be seen from the comparative experiment of the table, Example 2 herein, such an after-treatment produces pastes having undesirable flow characteristics.

SUMMARY OF THE INVENTION

It is, therefore, an object of this invention to provide a process for after-treating PVC powders such that the viscosity of polyvinyl chloride pastes prepared therefrom, especially in the low shear range, can be markedly reduced, without a concomitant deterioration in the good shelf life of the pastes.

Upon further study of the specification and appended claims, further objects and advantages of this invention will become apparent to those skilled in the art.

These objects have totally surprisingly been achieved by providing a process for the thermal after-treatment of paste-forming polymers of vinyl chloride, obtained by aqueous emulsion polymerization of vinyl chloride and, optionally, copolymerizable monomers, followed by spray-drying, comprising warming 20 to 60 percent by weight of the spray-dried powder for a period of 1 second to 30 minutes to temperatures of 75°–110° C. and then recombining the heated portion of the powder with the untreated portion of the powder.

DETAILED DISCUSSION

Preferably, 30 to 50 percent by weight of the spray-dried powder is warmed according to this invention. Preferably the powder is warmed to temperatures of 90°–100° C. In a further optimum embodiment of this process, the warming period is 1 second to 10 minutes.

In advantageous embodiments of the process of this invention, the relevant part of the powder is warmed by conveying it by means of hot gas; is warmed with hot gas in a fluidized bed drier; or is warmed by means of hot gas in a powder mill.

The suitable duration of exposure to the elevated temperature depends on how high the working temperature is. There is a readily determinable upper limit on the duration of the exposure of the powder to the elevated temperature imposed by the incipient thermal decomposition of the polyvinyl chloride powder.

If the medium employed for heat transfer, for example a gas, is at a moderate temperature of about 90° to about 100° C., the duration of the heat treatment of the polyvinyl chloride powder by the medium is on the order of minutes to achieve the desired treatment temperature; if, on the other hand, the medium is at a high temperature of, for example, 110° to 170° C., a contact period on the polyvinyl chloride of 1 to 10 seconds in general suffices for the polymer to reach treatment temperature.

More particularly with respect to duration of treatment at such temperatures, if the polyvinyl chloride powder is subjected to a treatment temperature of 75° to 85° C., the duration of treatment can be about 5 to 30 minutes. A longer duration of treatment does not improve the result. If the polyvinyl chloride is warmed to about 90°–100° C., a duration of treatment of 1 to 300 seconds is generally suitable, if it is warmed to about 105° to 110° C. the duration of treatment is less than 1 second.

Unless noted otherwise herein, all aspects and details of the preparation of the polymeric powders used in the process of this invention are fully conventional and are disclosed thoroughly in the prior art, e.g., in Kainer, Polyvinylchlorid und Vinylchlorid-Mischpolymerisate, Springer-Verlag, 1965, page 34 ff.

Suitable dispersions for use in the spray drying process include vinyl chloride homopolymer or copolymer dispersions prepared in a conventional manner by emulsion polymerization. Examples of suitable comonomers which can be employed are vinyl acetate, vinylidene chloride, vinyl ethers, acrylonitrile, acrylic acid esters and the like. Up to 20, preferably 0.2 to 10 mole percent of the comonomer can be present in the copolymer.

Emulsifiers which can be employed include all emulsifiers customary for the emulsion polymerization of vinyl chloride, such as alkylsulphonates, alkyl-sulphates, alkyl ether-sulphates, alkylbenzenesulphonates and salts of fatty acids.

Catalysts which can be employed include the customary water-soluble per-compounds, such as $H_2O_2$ or potassium persulphate, as well as the redox systems such as those disclosed, for example, in Kainer, Polyvinylchlorid und Vinylchlorid-Mischpolymerisate (Polyvinyl Choride and Vinyl Chloride Copolymers), Springer-Verlag, 1965, page 47 et seq.

The dispersions can contain customary amounts of emulsifier, for example about 2 percent by weight, but can also contain substantially larger amounts, for example 3 to 5 percent by weight, or smaller amounts, for example down to 0.3 percent by weight. The solids content of the dispersion also lies within customary limits, for example, 30 to 55 percent by weight, and preferably 40 to 55 percent by weight.

The spraying operation can be carried out in spray-drying towers of customary construction, such as are described, for example, in Ullmanns Encyklopädie der technischen Chemie, 1951, Volume 1, page 602 et seq. The drier exit temperature when drying plastisol grades is in general 55° to 70° C., and the drier entry temperature 140° to 180° C.

In using the process according to this invention, 20 to 60 percent by weight of the dry polyvinyl chloride powder coming from the spray drier, preferably 30 to 50 percent by weight, is subjected to a thermal after-treatment. This can in principle be carried out in all apparatuses by means of which heat can be transferred to the polyvinyl chloride powder. In an advantageous embodiment, the polyvinyl chloride powder is conveyed pneumatically by means of a hot jet of gas, by using a drive nozzle, such as is described, for example, in "Technische Strömungslehre" ("Industrial Rheology") by B. Eck, 1966, 7th edition, Springer-Verlag Berlin/Heidelberg/New York, page 328. Suitable gases include all inert gases, preferably nitrogen or air. The conveying speed is generally 15 to 40 m/s. The product-/air ratio is 1:5 to 1:0.2, preferably 1:4 to 1:0.5. The conveying air is warmed to 90°–170° C. The product-/air ratio is adjusted so that the product temperature at the exit of the conveying line is 75° to 110° C., preferably 90° to 100° C. A residence time of 1 second or more is necessary to achieve the desired effect.

The polyvinyl chloride powder thus treated is subsequently conventionally re-mixed in any suitable manner with 80 to 40 percent by weight, preferably 70 to 50 percent by weight, of the untreated polyvinyl chloride powder.

In a further advantageous embodiment, the relevant part of the polyvinyl chloride powder is treated with hot gas in a fluidized bed drier, such as is described, for example, in "Trochkner und Trochnungsverfahren" ("Driers and Drying Processes") by K. Kröll, 1959, Volume 2, Springer-Verlag, Berlin/Göttingen/Heidelberg, page 281. The impinging flow velocity of the gas, relative to the free cross-section, should be 0.4 to 0.6 m/s. The impinging gas is heated to 95°–110° C. The residence time of the powder in the drier is advantageously 5–10 minutes. The polyvinyl chloride temperature at the drier exit generally has values of 75° to 100° C.

In a further advantageous embodiment, the proportion of the polyvinyl chloride powder which is to be thermally after-treated is warmed with heated milling air in a powder mill, for example a pin beater mill, such as is described in "Grundoperationen chemischer Verfahrenstechnik" ("Basic Operations in Chemical Process Technology") by W. R. A. Vauck and H. A. Müller, 1974, 4th edition, Verlag Theodor Steinkopff, page 265 et seq. Pin beater mills are usually employed in working up paste-grade polyvinyl chloride powders. The milling air is advantageously heated to 120°–140° C., so that the polyvinyl chloride powder becomes warmed to 90°–110° C., preferably to 90°–100° C. The residence time in the mill is generally 1 to 10 seconds.

Pastes can be formed from the thus treated powder by fully conventional methods, e.g., as disclosed in Kunststoff-Handbuch, Polyvinylchlorid, Carl Hanser Verlag, 1963, Band II, page 104 ff.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(Comparative Example)

A spray-drying tower of the conventional type of construction, and having a capacity of about 50 m³, is equipped with 5 two-material nozzles. The dispersion to be sprayed is polymerized using an emulsifier mixture of alkylsulphonate, alkyl-sulphate and alkyl ether-sulphate, as described in Example 1 of German Patent Specification No. 2,428,706. The dispersion has a solids content of 45% and an emulsifier content of 2%, relative to polyvinyl chloride. The tower entry temperature is 160° C. and the tower exit temperature 60° C.; the pressure of the spraying air is 4.2 bar; the amount of warm air is 4,500 Nm³/h; the spray ratio is 3.0 kg of spraying air/kg of dispersion; and the output is 63 kg of dispersion per nozzle per hour.

The dried polyvinyl chloride power is sieved on a sieving machine having a cover of 500 μm mesh size. The coarse material separated out amounts to 1%. A paste is prepared from 100 parts by weight of the polyvinyl chloride powder thus obtained and 60 parts by weight of di-2-ethylhexyl phthalate (DOP). Its viscosity is measured after 2 and 24 hours storage at different shearing rates in a rotary rheometer (instrument: Rheomat 30 from Messrs. Contraves AG, Zürich). The thickening factor TF is a measure of the shelf life of the paste. It is determined from the quotient of the viscosity determined after a storage time of 24 hours, divided by the viscosity determined after 2 hours, at a shearing rate of $D = 1 \text{ s}^{-1}$. The table shows the paste viscosities at different shearing rates, as well as the thickening factor TF.

EXAMPLE 2

(Comparative Example)

The procedure described in Example 1 is followed. A representative sample of the dried polyvinyl chloride powder is stored for a period of 0.25 hour in a drying cabinet at 90° C. The paste viscosity of the powder, when worked into a paste in the ratio of 100:60, and the thickening factor of the paste are shown in the table.

EXAMPLE 3a (According to the Invention)

The procedure described in Example 1 is followed. 30 parts by weight of the spray-dried polyvinyl chloride powder are pneumatically conveyed by means of a jet of air, heated to 110° C., by a drive nozzle. The conveying velocity is 25 m/s and the product/air ratio is 1/2. The temperature of the polyvinyl chloride powder, measured at the end of a 30 m long conveying zone, is 90° C. After the powder has cooled, it is recombined with 70 parts by weight of the untreated powder. The duration of warming to >75° C. is about 1.5 seconds. The paste viscosity of the mixed powder, worked into a paste in the ratio of 100:60, and the thickening factor are shown in the table.

EXAMPLE 3b (According to the Invention)

The procedure described in Example 3A is followed, except that the mixing ratio of thermally after-treated powder to untreated powder is 50 parts by weight to 50 parts by weight. The paste viscosity and thickening factor of the powder are shown in the table.

EXAMPLE 4

(According to the Invention)

The procedure described in Example 1 is followed. 50 parts by weight of the spray-dried powder are continuously run through a fluidized bed drier which is equipped with a fluidizing grid of size 0.5 m². The impingement velocity of the air, heated to 100° C., is 0.5 m/s, relative to the free cross-section. The temperature of the powder is 90° C. The residence time of the powder in the fluidized bed drier is set to 5 minutes. The duration of warming to >75° C. is 5 minutes. Following the heat treatment, the powder is mixed with 50 parts by weight of the untreated powder. The paste viscosity, the powder being worked into a paste in the ratio of 100:60, and the thickening factor of the powder are shown in the table.

EXAMPLE 5

(According to the Invention)

The procedure described in Example 1 is followed. 50 parts by weight of the spray-dried polyvinyl chloride powder are fed to a pin beater mill (type HZ from Messrs. Condux). The mill is charged with 150 kg of polyvinyl chloride powder per hour, at a rotor speed of 3,000 rpm. The milling air is heated to 130° C. and passed through the mill at a rate of 200 $Nm^3/h$. The temperature of the polyvinyl chloride powder, measured at the mill exit, is 95° C. The duration of warming to >75° C. is 1.1 seconds. Following the heat treatment, 50 parts by weight of the polyvinyl chloride powder are mixed with 50 parts by weight of the untreated polyvinyl chloride powder. The paste viscosity and the thickening factor of the mixed polyvinyl chloride powder are shown in the table.

TABLE

| Example | Paste viscosity (PVC/DOP ratio 100/60) in dPa.s at a shearing rate D in $s^{-1}$ | | | | | | | | Thickening factor TF ($\eta$ 24 h/$\eta$ 2 h) at D = 1 $s^{-1}$ |
|---|---|---|---|---|---|---|---|---|---|
| | D = 0.3 | | D = 1 | | D = 10 | | D = 100 | | |
| | 2 h | 24 h | 2 h | 24 h | 2 h | 24 h | 2 h | 24 h | |
| 1 (untreated) | 160 | 350 | 69 | 175 | 40 | 85 | 34 | 54 | 2.5 |
| 2 (prior art) | 80 | 88 | 160 | 190 | 500 | 600 | 250 | 290 | 1.2 |
| 3A | 57 | 125 | 42 | 78 | 32 | 55 | 30 | 48 | 1.9 |
| 3B | 52 | 52 | 40 | 42 | 38 | 43 | 38 | 44 | 1.1 |
| 4 | 50 | 50 | 40 | 44 | 36 | 46 | 36 | 46 | 1.1 |
| 5 | 48 | 53 | 42 | 46 | 40 | 45 | 40 | 45 | 1.1 |

As shown in the table, the process of this invention dramatically and surprisingly reduces the resultant paste viscosity and improves shelf life as measured by a thickening factor (low values corresponding to high shelf lives).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the thermal after-treatment of paste-forming homo- or copolymers of vinyl chloride, obtained by aqueous emulsion polymerization, followed by spray-drying to produce a spray dried powder, the improvement wherein 20 to 60 percent by weight of the spray-dried powder is warmed for 30 minutes to 1 second to a treating temperature of 75°–110° C. and, then is recombined with the non heat-treated, 80–40 percent by weight portion of the spray dried powder.

2. A process of claim 1, wherein 30 to 50 percent by weight of the spray-dried powder is warmed and then recombined with the untreated portion of the powder.

3. A process of claim 1, wherein the treating temperature is 90°–100° C.

4. A process of claims 1 or 3, wherein the powder is warmed for a period of 10 minutes to 1 second.

5. A process of claim 1, wherein the treated portion of the powder is warmed by conveying it in a hot gas.

6. A process of claim 1, wherein the treated portion of the powder is warmed with hot gas in a fluidized bed drier.

7. A process of claim 1, wherein the treated portion of the powder is warmed with hot gas in a powder mill.

8. A process of claim 5, 6 or 7, wherein hot air is the hot gas.

* * * * *